United States Patent [19]
von Rehren Borgstedt et al.

[11] Patent Number: 5,693,304
[45] Date of Patent: Dec. 2, 1997

[54] AMORPHOUS ALKALI METAL SILICATE PROCESS AND USES

[75] Inventors: Eric von Rehren Borgstedt, Jeffersonville, Pa.; Raymond P. Denkewicz, Jr., La Grange, Ky.

[73] Assignee: PQ Corporation, Valley Forge, Pa.

[21] Appl. No.: 456,633

[22] Filed: Jun. 1, 1995

Related U.S. Application Data

[62] Division of Ser. No. 386,722, Feb. 10, 1995, which is a division of Ser. No. 109,885, Aug. 23, 1993, abandoned.

[51] Int. Cl.$^6$ ........................................... C01B 33/32
[52] U.S. Cl. ........................ 423/332; 423/333; 423/334
[58] Field of Search ............................... 423/332, 333, 423/334; 252/174.23, 174.25, 135; 264/42; 501/85; 65/17.1, 22

[56] References Cited

U.S. PATENT DOCUMENTS

| | | | |
|---|---|---|---|
| 2,179,806 | 11/1939 | Wegst et al. | 23/110 |
| 2,206,289 | 11/1940 | McDaniel | 23/110 |
| 3,020,125 | 2/1962 | Eisenberg et al. | 23/110 |
| 3,450,494 | 6/1969 | Gaiser | 23/110 |
| 3,749,759 | 7/1973 | Freyhold et al. | 423/332 |
| 3,839,226 | 10/1974 | Yates | 252/454 |
| 4,080,187 | 3/1978 | Parnell | 65/22 |
| 4,585,642 | 4/1986 | Rieck | 423/333 |
| 5,183,651 | 2/1993 | Schimmel et al. | 423/334 |
| 5,211,930 | 5/1993 | Schimmel et al. | 423/333 |
| 5,236,682 | 8/1993 | Schimmel et al. | 423/334 |
| 5,268,156 | 12/1993 | Schimmel et al. | 423/334 |

FOREIGN PATENT DOCUMENTS

| | | |
|---|---|---|
| 2014674 | 10/1971 | Germany . |
| 3417649 | 11/1985 | Germany . |
| 2099412 | 12/1982 | United Kingdom . |

*Primary Examiner*—Deborah Jones
*Assistant Examiner*—Amy M. Harding
*Attorney, Agent, or Firm*—Cushman Darby & Cushman IP Group of Pillsbury Madison & Sutro, LLP

[57] ABSTRACT

A particulate amorphous alkali metal silicate is prepared by heating a mixture of silicate glass and water or aqueous solution to a temperature of about 300°–400° C. to provide a foamed material that is easily formed into particles of less than 20 microns. After careful hydration, a product having 1–15% water based on loss of ignition (LOI) of product at 800° C. is produced that controls the activity of magnesium in solutions and is, therefore, a useful detergent ingredient.

10 Claims, No Drawings

AMORPHOUS ALKALI METAL SILICATE PROCESS AND USES

This is a division of Application No. 08/386,722, filed Feb. 10, 1995, which is a divisional of No. 08/109,885, filed Aug. 23, 1993, now abandoned.

BACKGROUND OF THE INVENTION

This invention relates to amorphous alkali metal silicate particles of controlled hydration and solubility, a process for making the silicate, and uses thereof, especially for detergents and cleaning products. In particular, the invention involves a process of heating a mixture of alkali metal silicate glass and water to provide an expanded silicate product which is easy to form into particles. The resultant particulate product, when hydrated, provides excellent properties as a detergent ingredient.

Alkali metal silicates are articles of commerce that have been produced for over 100 years and are used in numerous industrial and consumer products. These products, usually sodium or potassium silicates, are available in various forms: solutions, anhydrous glasses, hydrated solids and hydrated or anhydrous crystals. The preparation of hydrated solid silicates, either crystalline, or amorphous, presents some difficulty since the products are hygroscopic and tend to cake.

Non-crystalline (i.e., amorphous) products are commonly prepared by dissolving a silicate glass and spray drying the resulting solution. The product consists of small spheres, some of which are hollow. The water-content must be carefully controlled to a narrow range around 20%. If the moisture content is too high, the product will cake; if it is too low, dissolution is difficult.

Several attempts have been made to prepare a product that is somewhat different by heating a silicate solution under pressure to temperatures considerably above boiling and then injecting the solution into a zone of reduced pressure. Water is removed without further heating and an expanded silicate is realized. See British Patent 788,933 (1958) and U.S. Pat. No. 3,450,494 (1969). These materials have not been found to be useful. These methods all have the disadvantage that silicate glass must be dissolved and then dried under rather exacting conditions to provide a useful product.

It would be desirable to hydrate glasses directly to provide the product, thereby eliminating the solution, step and the costly spray drying step. It would also be desirable to form a product from such a process having lower water content (<15%) since such products are more stable for storage and use.

Various methods of hydrating silicate glass to provide stable products have been attempted. U.S. Pat. No. 3,782,906 suggests hydrating and agglomerating alkali metal silicate glass in a fluid bed wherein the expansion gas is steam. This process and product have not found acceptance by silicate producers or by silicate users.

It is an object of this invention to provide a process for producing a non-crystalline alkali metal silicate that does not cake, with a controlled water content so that the solubility and other properties are controlled. In particular, the product of our process provides desirable properties to the detergent industry. It is also an object of this invention to provide a process for preparing a finely divided hydrated silicate that does not require dissolution of the glass and spray drying.

SUMMARY OF THE INVENTION

The process required to provide the particulate hydrated amorphous alkali metal silicate product of our invention is surprisingly simple when compared to the processes of the prior art. In accordance with the invention, alkali metal silicate glass particles are mixed with water or various solutions; the mixture is heated under conditions that induce foaming and expansion within about 5 to 30 minutes after the mixture attains about 300° C. or more. This foamed and expanded material is easily processed by shattering, milling, etc. to particles of less than 20 microns to provide the stable powdered product. The water content is controlled and/or adjusted to a range between 0.5% and 15% to provide the desired properties. The invention product provides excellent magnesium ion removal from solutions and can sorb large amounts of liquids such as surfactants, so that it is a desirable ingredient for various detergents and cleaning compositions.

The preparation of the amorphous product of the invention is surprising since the glass/water mixture is heated at temperatures of about 300° to 400° C., and crystalline materials such as sodium metasilicate and sodium disilicate, among others, are known to form at such temperatures. See Tuttle and Frieman, JACS, 70, 919–926 (March 1948) and Rowe, Fournier and Morey, *Inorganic Chemistry*, 6, 3 1183–1888 (1967).

Our process and product solve one of the most important and persistent problems associated with providing alkali metal silicates as powders. Present commercial methods to provide such products involve dying or crystallization from a solution, and removal of sufficient water to provide uniform and stable materials is difficult as well as expensive. These products are also unstable in that they cake readily when they are exposed to moisture variation or temperature cycles. If a spray-dried silicate containing the usual 18 to 20% moisture is subjected to just 2 cycles of increased temperature followed by return to ambient temperature, sufficient caking to render the product useless can take place. The product of our process is not dried from a solution and only sufficient water is added to the final product to provide the desired properties. Such a product provides much greater stability to humidity and temperature variations.

THE INVENTION

The glass required for the invention process is sodium and/or potassium silicate. Such glasses are formed by the fusion of sources of the alkali metal and silica. Sodium and/or potassium carbonate is fused with sand to provide the molten glass which is processed to provide an appropriate particle size.

Various methods can be used following foaming to produce the particles required, such as rapid cooling of the glass and grinding or milling The glass used in our process contains 1.5 to 4.0 moles of $SiO_2$ for each mole of $M_2O$. M can be sodium and/or potassium. The ground glass particles required for the invention process can be any size that allows formation of a uniform mixture when combined with water. Satisfactory products have been prepared using anhydrous glass with a particle size range between 60 and 250 micrometers (μm).

The particles of anhydrous glass are mixed with water or an aqueous solution, thereby forming a mixture. The solution can be sodium and/or potassium hydroxide, or sodium and/or potassium silicate or a mineral acid solution. Sufficient water or aqueous solution is used so that the anhydrous glass mixture contains 5 to 20% water. The heat generated by mixing can provide a temperature of 20° to 30° C. The mixture can be further heated immediately after mixing, or it can be stored for 24 hours or more prior to heating to foaming conditions. It is preferred to heat the mixture within about 30 minutes of preparation.

The mixture is heated in the foaming step to a temperature between about 300° C. and about 400° C. for sufficient time to provide formation of a foam. If the temperature is too low, the expansion by foaming will not be sufficient to provide a product with the required properties. If the temperature is above about 400° C., undesirable crystalline species form. The foam is produced about 8 to 30 minutes after attaining a temperature in the range of about 300° to about 400° C. The rate at which the mixture is heated to about 300° to about 400° C. does not appear to be critical. The foamed material is removed from the heat ad cooled to about room temperature. The cooled foam is easily shattered to form small particles of less than 20 microns.

The foamed and expanded silicate and the particles realized from it are essentially anhydrous (less than 1% by weight water). In this state, the product is not effective as a detergent ingredient. In particular, the product does not provide adequate reduction of magnesium activity in a wash bath. Therefore, an additional process step is generally required in which the foamed and powdered material is exposed to water in such a manner that the water is incorporated into or on the silicate particles in such a way that the product does not cake. For example, the partially powdered foam can be treated in an air mill using moist air, or the powdered product can be hydrated in a fluid bed using moist air for expansion. The product useful for detergents must contain at least 0.5% water to be effective and can contain up to 15%. If it contains more than 15% water, the product is prone to caking. The preferred product contains 1 to 12% moisture as determined by loss on ignition (LOI) determined by measuring weight loss of a sample hated to 800° C.

The composition of the invention product contains about 1.5 to 4.0 moles of $SiO_2$ for each mole of $M_2O$ wherein M can be sodium and/or potassium. The product is amorphous to x-rays. Among the properties that make the invention product desirable as a detergent ingredient are its magnesium exchange capacity and it absorption of liquids. Our product can sequester at least 2 milliequivalents of Mg per gram of anhydrous production. It can sorb 30 to 50% by weight of liquids, such as surfactants. These properties are provided by products with a $SiO_2/M_2O$ ratio of about 1.5 to 3.0.

The particulate silicate product of the invention is useful for any application that requires a solid amorphous silicate of a water content that is considerably below that available with present commercial products. The hydrated product of this invention is especially useful in detergent and cleaning compounds. It is advantageous to use our product in combination with other builder materials known to be effective in reducing the calcium activity in washing baths. Since this product provides desirable additional alkalinity and corrosion control, it is useful to include it in detergent formulations with other builders such as condensed phosphates, NTA, citric acid, carbonates, layered silicates, polycarboxylates, zeolites and the like.

A detergent builder combination of zeolite A and our expanded pulverized silicate product is particularly desirable for laundry detergents. The ion exchange properties of zeolite A are such that it removes calcium ions from hard water wash baths effectively, but it is relatively ineffective in removing magnesium ions. The combination of zeolite A and the product of this invention provides effective removal of hardness ions from solution while providing additional detergent properties. The proportions of zeolite NaA and the product of our invention can be any that sequester the calcium and magnesium hardness ions present in the washing bath. In addition, the high liquid loading possible with the invention product is an advantage for either laundry detergents or dishwashing detergents made by agglomeration and post blending methods.

The foamed and expanded silicate and the hydrated particles of our invention are also useful for other applications requiring silicate materials. For example, they can be included in cements and in particular certain acid-resistant cements as part of the setting agent. They are also a suitable material or the preparation of other silicate containing materials such as aluminosilicates and crystalline silicate.

EXAMPLES

The following non-limiting examples illustrate several embodiments of our invention. These examples are not provided to establish the scope of the invention, which is described in the disclosure and recited in the claims.

The proportions in the examples are in parts by weight (pbw), percent by weight, parts per million (ppm), moles or equivalents. The calcium and magnesium ion exchange rates and capacities were determined for various products and are reported as the calcium exchange rate (CER), calcium exchange capacity (CEC), magnesium exchange rate (MgER) and magnesium exchange capacity (MgEC). These results are expressed as milligrams (mg) of $CaCO_3$/gram (g) of anhydrous product for both calcium and magnesium. Such reporting practice is common in the detergent industry. The magnesium exchange capacity is described in the disclosure and recited in the claims as milliequivalents of Mg per gram of anhydrous product for brevity.

The calcium and magnesium performance (CER, CEC, MgER and MgEC) were determined as follows. The product (0.5 grams on an anhydrous basis) was reacted with 250 milliliters (ml) of a solution containing either calcium or magnesium ions. The concentration of these solutions was 1000 ppm expressed as $CaCO_3$. The stirred reaction mixture was buffered at pH 10 with 2 to 3 mls of a solution of $NH_4Cl$ and $NH_4OH$. The temperature was held at 25° C. during the titration. An aliquot (15 ml) was removed after 2 minutes to determine the CER or MgER by pulling the suspension through a 1.0 micron filter into a syringe. A second aliquot was removed at 15 minutes to determine the CEC or MgEC.

The filtrates were analyzed for calcium in solutions as follows. A 5 ml aliquot of filtrate was combined with 5 ml of 1 molar NaOH and about 100 milligrams of Hydroxy Naphthol Blue indicator. A titration to a definite blue endpoint was carried out with 0.005 molar ethylene diaminetetracetic acid (EDTA) and the volume of EDTA recorded.

A blank titration using 5 ml of the 1000 ppm $CaCO_3$ solution was carried out using the same method and the volume of EDTA recorded. Filtrates were analyzed for Mg in the same manner except that 5 ml of an $NH_4OH/NH_4Cl$ buffer and about 100 mg Erichrome Black T indicator were used. The rates and capacities for calcium or magnesium ions in solution were calculated as mg of $CaCO_3$/g of product as follows:

$$\text{milligrams } CaCO_3/\text{gram anhydrous product} = [(B-V) \times M \times FW \times 50]/\left(\frac{100-LOI}{100}\right)W$$

B=volume of EDTA for blank titration (ml)
V=volume of EDTA for sample titration (ml)
M=Molarity of EDTA solution
FW=Formula weight of $CaCO_3$ (100.1 g/mole)

LOI=Loss on Ignition of product at 800° C. (%)
W=Weight of product (grams)

Liquid loading was determined as follows. A sample of the product (5 g) was combined with a known amount of liquid, usually a surfactant containing 0.1% of Calcozinc Rhodamine BX dye. If necessary, the liquid-dye combination was heated to 30° C. prior to use. The mixture was agitated for 30 seconds using a spatula; then the mixture was placed in a closed bottle and shaken gently for an additional 30 seconds. After a 15 minute quiescent aging period, the sample was poured onto a piece of white photocopy paper to form a compact heap having a 2.5 inch diameter base. After 3 minutes the mixture was removed from the paper which was allowed to dry for an hour. If red spots were not observed, the test was repeated with an increased amount of liquid. When significant red spotting was observed the sample was not holding the liquid, and the test was repeated using less liquid. The liquid loading in percent by weight was determined based on the weight of liquid sorbed by the product on an anhydrous basis.

The amorphous crystalline or partially crystalline nature of the materials generated in the examples was determined using standard x-ray diffraction techniques. A 5–50 2 θ scan was used.

EXAMPLES 1–6

Eight pbw of ground sodium silicate glass of various $SiO_2/Na_2O$ ratios was mixed vigorously with 2 pbw of deionized, distilled water for 10 minutes. No heating or cooling was supplied during mixing. The resulting mixture was held at room temperature for 15 minutes. The mixture was then heated at a rate of 5° C./min to 400° C. and held at 400° C. for 10 minutes. The resulting foamed and expanded material was allowed to cool to room temperature and then milled easily to a particle size below about 20μ. The milled material was hydrated in a 75% relative humidity chamber until a product with a LOI of 1 to 4% was attained. The products were tested for crystallinity using x-ray diffraction (XRD). CER, CEC, MgER, MgEC and surfactant loading were determined as described above. The variations of $SiO_2/Na_2O$ in the glass and the properties measured are summarized in Table 1.

These results indicate tat the expanded product can be prepared from silicates of various ratios of $SiO_2/Na_2O$ but that products useful in controlling magnesium ion in solution will have $SiO_2/Na_2O$ weight ratios of about 1.5 to 2.5.

EXAMPLES 7–12

Mixtures of 8 pbw of sodium silicate glass (2.0 moles of $SiO_2$ per mole of $Na_2O$) and 2 pbw of water were prepared, heated, milled and hydrated as described in Examples 1–6, except that the heating temperature was varied. The mixtures were heated at 5° C. per minute to temperatures between and including 250° to 500° C. The results of these tests are summarized in Table 2.

TABLE 2

Preparing Products at Various Temperatures

| Example | Temperature (°C.) | MgER* | MgEC* | LOI (%) | XRD Result |
|---|---|---|---|---|---|
| 7 | 250 | 100 | 269 | 4.35 | Amorphous |
| 8 | 300 | 225 | 363 | 3.6 | Amorphous |
| 9 | 350 | 211 | 349 | 3.1 | Amorphous |
| 10 | 400 | 206 | 357 | 2.9 | Amorphous |
| 11 | 450 | — | — | — | Partly Crystalline |
| 12 | 500 | — | — | — | Partly Crystalline |

*units are mg $CaCO_3$/g anhydrous product

The results indicate that the preferred amorphous product of the invention was obtained when temperatures of about 300° to about 400° C. were used.

EXAMPLES 13–15

Mixtures of ground sodium silicate glass (2.0 $SiO_2/Na_2O$) and water were prepared, heated, milled and hydrated as described in Examples 1–6, except that various proportions of ground glass and water were used. The results are summarized in Table 3.

TABLE 1

Preparing Products from Glasses of Various $SiO_2/Na_2O$ Ratio

| Example | $SiO_2/Na_2O$ (wt/wt) | CER* | CEC* | MgER* | MgEC* | LOI (%) | XRD Result | Surfactant Loading** (%) |
|---|---|---|---|---|---|---|---|---|
| 1 | 1.50 | 88 | 176 | 415 | 474 | 2.3 | Amorphous | 30–40 |
| 2 | 1.70 | 44 | 132 | 367 | 470 | 2.7 | Amorphous | 30–40 |
| 3 | 2.00 | 24 | 24 | 206 | 357 | 2.9 | Amorphous | 40–50 |
| 4 | 2.40 | 18 | 21 | 81 | 242 | 1.6 | Amorphous | 30–35 |
| 5 | 2.75 | 20 | 30 | 40 | 150 | 1.4 | Amorphous | 40 |
| 6 | 3.22 | 35 | 35 | 25 | 90 | 2.1 | Amorphous | 40 |

*units are mg $CaCO_3$/g anhydrous product
**Neodol 25-7

TABLE 3

Preparing Products Using Different Amounts of Water

| Example # | GLASS (pbw) | WATER (pbw) | CER* | CEC* | MgER* | MgEC* | LOI (%) | XRD Results |
|---|---|---|---|---|---|---|---|---|
| 13 | 9.5 | 0.5 | 44 | 54 | 156 | 329 | 2.2 | Amorphous |
| 14 | 9.0 | 1.0 | 29 | 34 | 186 | 342 | 2.4 | Amorphous |
| 15 | 8.5 | 1.5 | 24 | 30 | 210 | 362 | 2.2 | Amorphous |
| 3 | 8.0 | 2.0 | 24 | 24 | 206 | 357 | 2.9 | Amorphous |

*units are mg of $CaCO_3$/g anhydrous product

These results indicate that useful products can be made if insufficient water is present to induce foaming upon heating of the glass-water mixture to a temperature of about 300° to 400° C. Mixtures that contain more water do not provide useful products.

EXAMPLES 16–18

Mixtures of ground sodium silicate glass (2.0 $SiO_2$/$Na_2O$) and water were prepared, heated, milled and hydrated as described in Examples 1–6, except that the mixtures were held (aged) for different periods of time after forming the mixture but prior to heating. The results are summarized in Table 4.

TABLE 4

Preparing Product at Various Aging Times

| Example | Aging Time* | MgER** | MgEC** | LOI (%) | XRD Result |
|---|---|---|---|---|---|
| 16 | 15 min. | 206 | 357 | 2.9 | Amorphous |
| 17 | 2 hours | 210 | 346 | 2.7 | Amorphous |
| 18 | 24 hours | 205 | 340 | 3.1 | Amorphous |

*at room temperature
**units are mg $CaCO_3$/g anhydrous product

These results indicate that the aging time of the glass-water mixture did not significantly alter the properties of the invention product.

EXAMPLES 19–22

Mixtures of ground sodium silicate (2.0 $SiO_2$/$Na_2O$) and water were prepared, heated, milled and hydrated as described in Examples 1–6, except that the heating rate to 400° C. was varied. These heating rates and the results are summarized in Table 5.

TABLE 5

Preparing Product at Various Heating Rates

| Example | Heating Rate to 400° C. (C/min) | MgER* | MgEC* | LOI (%) | XRD Result |
|---|---|---|---|---|---|
| 19 | 0.5 | 188 | 330 | 1.3 | Amorphous |
| 20 | 5 | 206 | 357 | 2.9 | Amorphous |
| 21 | 10 | ND | ND | ND | Amorphous |
| 22 | 15 | 188 | 334 | 3.5 | Amorphous |

*units are mg $CaCO_3$/g anhydrous product
ND = Not Determined

Results are discussed with the result obtained in Example 23.

EXAMPLE 23

A mixture of 8 pbw of sodium silicate glass (2.0 $SiO_2$/$Na_2O$) and 2 pbw of water was prepared and aged for 15 minutes prior to heating. The mixture was exposed immediately to 400° C. The mixture foamed as usual after a short induction period. The milled expanded product hydrated to an LOI of 2.7% was found comparable to other products with a MgER of 208 and a MgEC of 338 expressed as mg of $CaCO_3$/g anhydrous product. This result combined with those of Examples 19–22 indicate that various heating programs can be used to prepare the product of our invention.

EXAMPLES 24–27

Mixtures of ground sodium silicate glass (2.0 $SiO_2$/$Na_2O$) and water were prepared, heated, milled and hydrated as described in Examples 1–6, except that the time of exposure to a temperature of 400° C. was varied. These times and the results are summarized in Table 6.

TABLE 6

Preparing Product Using Various Heating Times

| Example | Heating Time @ 400° C. | MgER* | MgEC* | LOI (%) | XRD Result | Surfactant Loading** (%) |
|---|---|---|---|---|---|---|
| 24 | 10 min | 206 | 357 | 2.9 | Amorphous | 40–50 |
| 25 | 30 min | ND | ND | ND | Amorphous | ND |
| 26 | 1 hr | 192 | 323 | 2.6 | Amorphous | ND |
| 27 | 12 hrs | 185 | 310 | 1.1 | Amorphous | 30 |

*units are mg $CaCO_3$/g anhydrous product
**Neodol 25-7
ND = Not Determined

These results indicate that the heating time at a temperature of 400° C. is only limited by efficient production.

EXAMPLES 28–31

Mixtures of ground sodium silicate glass (2.0 $SiO_2$/$Na_2O$) and water were prepared, heated, milled and hydrated as described in Examples 1–6, except that the products were adjusted to various LOI levels by exposure to 75% relative humidity. These moisture levels and the results are Summarized in Table 7.

TABLE 7

Preparing Product at Various Water Contents

| Example | LOI (%) | CER* | CEC* | MgER* | MgEC* | XRD Result |
|---|---|---|---|---|---|---|
| 28 | 0 | 12 | 27 | 150 | 250 | Amorphous |
| 29 | 1.50 | 19 | 25 | 225 | 335 | Amorphous |

TABLE 7-continued

Preparing Product at Various Water Contents

| Example | LOI (%) | CER* | CEC* | MgER* | MgEC* | XRD Result |
|---|---|---|---|---|---|---|
| 30 | 3.50 | 20 | 31 | 233 | 341 | Amorphous |
| 31 | 15.41 | 25 | 34 | 253 | 360 | Amorphous |

*units are mg $CaCO_3$/g anhydrous product

The results of Example 28 show that the anhydrous product formed by heating is not useful as a potential detergent ingredient. Surprisingly, the hydration of the products to LOI levels of about 1.0% or greater results in extremely useful materials.

EXAMPLES 32–34

Mixtures of ground sodium silicate glass (2.0 $SiO_2$/$Na_2O$) and water were prepared, heated, milled and hydrated as described in Examples 1–6 except that the particle size of the ground glass was varied. These particle sizes and the results obtained are summarized in Table 8.

TABLE 8

Preparing Product From Glasses of Various Particle Sizes

| Example | Particle Size Range (μm)** | MgER* | MgEC* | LOI (%) | XRD Result |
|---|---|---|---|---|---|
| 32 | <75 | 206 | 375 | 2.9 | Amorphous |
| 33 | 125–150 | 169 | 370 | 1.9 | Amorphous |
| 34 | 212–250 | 164 | 336 | 1.6 | Amorphous |

*units are mg $CaCO_3$/g anhydrous product
**determined using U.S. Series sieves

EXAMPLES 35–38

A produce prepared as described in Example 3 was tested for sorption of various liquids as described previously. The results are summarized in Table 9.

TABLE 9

Liquids Sorbed by Product

| Example | Liquid Sorbed | Liquid Loading (%) |
|---|---|---|
| 35 | Mineral Oil | 35–40 |
| 36 | Triton ® X-100 | 30–35 |
| 37 | Triton ® N-101 | 30–35 |
| 38 | Neodol ® 23-3 | 25–30 |
| 3 | Neodol ® 25-7 | 40–50 |

These results indicate that various liquids are sorbed by the product of our invention in substantial amounts.

EXAMPLES 39–42

Mixtures of ground alkali metal silicate glass (2.0 moles $SiO_2$/mole of $M_2O$) were prepared, heated, granulated and hydrated as described in Examples 1–6, except that $M_2O$ was $Na_2O+K_2O$ as summarized in Table 10.

These results show that glasses with mixtures of sodium and potassium ions can be processed and form desirable products.

EXAMPLE 43

A mixture of 8 pbw ground sodium silicate glass (2.0 $SiO_2$/$Na_2O$) and 2 pbw water was prepared, heated, milled and hydrated as described in Example 18 except that an acid solution containing 0.2 pbw of 2N HCl and 1.8 pbw of water was substituted for the water. The resulting material having an LOI of 2.47% was tested and had a MgER of 249 and a MgEC of 384 expressed as mg of $CaCO_3$/gram of anhydrous product.

EXAMPLE 44

A mixture of 8 pbw ground sodium silicate glass (2.0$SiO_2$/$Na_2$) and 2 pbw water was prepared, heated, milled and hydrated as described in Example 18 except that the water contained NaOH. The solution contained 0.17 pbw of NaOH and 1.83 pbw of water. The resulting material had a MgER of 250 mg $CaCO_3$/g of anhydrous product and a MgEC of 377 mg $CaCO_3$/g of anhydrous product at an LOI of 2.0 and had a $SiO_2$/$Na_2O$ ratio of 1.9.

EXAMPLE 45

The excellent stability of our invention product compared to spray dried materials was demonstrated by a heating test. Our product prepared as described in Example 3 and a spray dried sodium silicate (2.0 $SiO_2$/$Na_2O$ and 20% water) were placed in sealed containers and subjected to heating to 50° C. for 14 hours and cooled to room temperature for 10 hours. After 2 cycles, the spray dried material formed a dense cake, while the product of our invention remained free flowing.

EXAMPLE 46

A product prepared as described in Example 3 was tested as a detergent builder and as a co-builder with zeolite NaA under the following conditions using a Terg-o-Tometer® at 100 cycles per minute:

Water Hardness: 150 ppm (2:1 Ca/Mg ratio)
Dissolve Time: 2 min
Wash Time: 10 min
Rinse Time: 5 min
Soiled Cloth Load: two swatches each of cotton, polyester, and cotton-polyester blend* soiled with dust-sebum two swatches each of cotton, polyester, and cotton-polyester blend* soiled with ground-in clay one swatch each of cotton, polyester, and cotton-polyester blend* unsoiled Surfactant: Linear Alkyl Sulfonate
*50% cotton/50% polyester with a durable press finish The cleaning effectiveness of each formulation was determined with a Hunter Colorimeter using the L scale (whiteness) to approximate the response of the human eye. The pre-washed clean cloths and pre-washed soiled cloths were used as limiting standards for determining ΔL for each fabric type. An average percent increase in reflectance (ΔL) was determined for each pair of similar soil-cloths within a wash-pot. The reported ΣΔL values are the sums of the ΔL scores for all three fabric types similarly soiled within one wash-pot. Ground-in clay and dust/sebum scores are reported separately.

The results are summarized in Table 11 and indicate clearly that the cleaning performance provided by a combination of zeolite NaA and our invention silicate product is very good over a broad range of temperatures. For the particular conditions of this test, the effective proportions of zeolite Na-A and our product appear to be 50 to 75 pbw of zeolite and 25 to 50 pbw of our product.

EXAMPLE 47

Eight pbw of ground potassium silicate glass ($SiO_2$/$K_2O$= 2.5 weight ratio) was mixed vigorously with 2 pbw of water and the resulting mixture was aged 15 minutes. The aged glass/water mixture was heated to 400° C. at 5° C./minute and held at this temperature for 10 minutes. The resulting foam and expanded material was allowed to cool to room temperature and then milled easily to a particle size below about 20μ. The milled material was hydrated in a 75% relative humidity chamber until a product with a LOI of 3 to 5% was attained. The resulting product was amorphous. The MgER was 90 mg $CaCO_3$/g of anhydrous product and MgEC was 155 $CaC_3$/g of anhydrous product.

TABLE 10

Preparing Product With Various Alkali Metal Composites

| Example | $M_2O$ | CER | CEC | MgER* | MgEC* | LOI | XRD Result | Surfactant Adsorption (%)** |
|---|---|---|---|---|---|---|---|---|
| 39 | 0.95 $Na_2O$ + 0.05 $K_2O$ | 31 | 41 | 245 | 352 | 1.8 | Amorphous | 30–35 |
| 40 | 0.9 $Na_2O$ + 0.1 $K_2O$ | 24 | 39 | 235 | 362 | 1.6 | Amorphous | 30–35 |
| 41 | 0.8 $Na_2O$ + 0.2 $K_2O$ | 20 | 34 | 251 | 379 | 1.3 | Amorphous | 30–35 |
| 42 | 0.7 $Na_2O$ + 0.3 $K_2O$ | ND | ND | ND | ND | ND | Amorphous | ND |

*units are mg $CaCO_3$/g anhydrous product
**Neodol 25-7
ND = not determined

TABLE 11

Product as Builder and Co-builder for Detergent

| Builder System Silicate Product/Z $NaA^1$ | 10° C. | | 20° C. | | 40° C. | | 60° C. | |
|---|---|---|---|---|---|---|---|---|
| pbw/pbw | D-S² | G-C³ | D-S | G-C | D-S | G-C | D-S | G-C |
| 100/0 | 24.60 | 32.60 | 24.30 | 32.20 | 35.95 | 34.95 | 35.40 | 32.75 |
| 75/25 | 29.95 | 33.85 | 39.90 | 36.80 | 40.60 | 39.50 | 39.86 | 38.60 |
| 50/50 | 38.40 | 39.80 | 48.70 | 39.50 | 49.25 | 43.25 | 44.00 | 39.35 |
| 25/75 | 39.90 | 41.40 | 44.15 | 40.55 | 51.00 | 46.10 | 46.75 | 41.35 |
| 0/100 | 28.15 | 41.75 | 29.50 | 43.10 | 30.45 | 44.75 | 24.55 | 38.15 |

Co-Builder Concentration = 0.65 grams/liter
LAS Concentration = 0.35 grams/liter
¹ZNaA = Zeolite NaA
²D-S = Dust-Sebum Total (cotton, polyester + cotton-polyester)
³G-C = Ground-In Clay (cotton, polyester + cotton-polyester)

EXAMPLE 48

An acid resistant refractory can be prepared from a cement having a composition of 80 to 90 pbw of filler and 10 to 20 pbw of the essentially anhydrous alkali metal silicate particles having a particle size of below about 20μ produced as an intermediary in any of Examples 1 through 6. The filler for such a cement can be selected from the group consisting of raw fire clay, calcined fire clay, mullite or alumina or combinations thereof.

EXAMPLE 49

An acid resistant refractory can be prepared from a cement having a composition of 80 to 90 pbw of filler and 10 to 20 pbw of the essentially anhydrous alkali metal silicate particles having a particle size below about 20μ produced as an ntermediary in any of Examples 39 through 42. The filler for such a cement can be selected from the group consisting of raw fire clay, calcined fire clay, mullite or alumina or combinations thereof.

We claim:

1. A process for producing hydrated amorphous alkali metal silicate particles comprising 1.5 to 4.0 moles of $SiO_2$ for each mole of $M_2O$ wherein M is selected from the group consisting of sodium, potassium and mixtures thereof, and 0.5 to 15% by weight water, having a magnesium exchange capacity of more than about 2 milliequivalents of Mg per gram of anhydrous silicate, having the capacity to sorb 30 to 50% by weight of liquid nonionic surfactant, and having a particle size of less than 20 microns which process comprises the steps of:
 a. forming a mixture of
  (1) alkali metal silicate glass and
  (2) water or
  (3) an aqueous solution of
   i. an alkali metal silicate and/or an alkali metal hydroxide or
   ii. a mineral acid
 b. exposing the mixture of step a. to a temperature of about 300° to about 400° C. for a period of time sufficient to cause the mixture of glass and water or aqueous solution to foam and expand under conditions to produce an amorphous foam;
 c. cooling the amorphous foam of step b. and subjecting the cooled foam to fracturing conditions under which particles of less than 20 microns are formed from the foam;
 d. subjecting the particles of step c. to an atmosphere of moisture under conditions sufficient to provide a hydrated product containing 1 to 15 percent by weight of water based on loss on ignition (LOI) of produce at 800° C.; and
 e. recovering the hydrated amorphous alkali metal silicate product.

2. A process of preparing hydrated amorphous alkali metal silicate particles comprising the steps of:
 a. forming a mixture of
  (1) alkali metal silicate glass and
  (2) 5 to 20% by weight water or
  (3) an aqueous solution containing 5 to 20% water on a weight basis of
   i. an alkali metal silicate and/or an alkali metal hydroxide or
   ii. a mineral acid
 b. heating the mixture of step a. to a temperature of about 300° to about 400° C. for a period of time sufficient to cause the mixture of glass and water or aqueous solution to foam and expand under conditions to produce an amorphous foam;
 c. cooling the amorphous foam to a temperature at which the foam forms into particles and subjecting the cooled foam to fracturing conditions under which particles of less than 20 microns are formed;
 d. subjecting the particles obtained in step c. to a moist atmosphere under conditions which form a hydrated product containing 1 to 15 percent by weight of water based on loss on ignition (LOI) of the product at 800° C.; and e. recovering the hydrated amorphous alkali metal silicate product.

3. A process according to claim 2 wherein the cooled amorphous foam in step c. is milled to form the particles.

4. A process according to claim 2 wherein in step c. the amorphous foam is mixed with water to rapidly cool the foam and cause shattering and formation of the particles.

5. A process according to claim 2 wherein the mixture in step a. is alkali metal silicate glass and water.

6. Essentially anhydrous alkali metal silicate particles prepared by the method comprising:
   a. forming a mixture of
      (1) alkali metal silicate glass and
      (2) water or
      (3) an aqueous solution of
         i. an alkali metal silicate and/or an alkali metal hydroxide or
         ii. a mineral acid
   b. exposing the mixture of step a. to a temperature of about 300° to about 400° C. for a period of time sufficient to cause the mixture of glass and water or aqueous solution to foam and expand under conditions to produce an amorphous foam; and
   c. cooling the amorphous foam of step b. and subjecting the cooled foam to fracturing conditions under which particles of less than 20 microns are formed from the foam.

7. A process for producing essentially anhydrous alkali metal silicate particles comprising 1.5 to 4.0 moles of $SiO_2$ for each mole of $M_2O$ wherein M is sodium and/or potassium, and less than 1% by weight water, having a magnesium exchange capacity of more than about 2 milliequivalents of Mg per gram of anhydrous silicate, and having a particle size of less than 20 microns which process comprises the steps of:
   a. forming a mixture of
      (1) alkali metal silicate glass and
      (2) water or
      (3) an aqueous solution of
         i. an alkali metal silicate and/or an alkali metal hydroxide or
         ii. a mineral acid
   b. exposing the mixture of step a. to a temperature of about 300° to about 400° C. for a period of time sufficient to cause the mixture of glass and water or aqueous solution to foam and expand under conditions to produce an amorphous foam;
   c. cooling the amorphous foam of step b. and subjecting the cooled foam to fracturing conditions under which particles of less than 20 microns are formed from the foam.

8. Hydrated amorphorous alkali metal silicate particles comprising 1.5 to 4.0 moles of $SiO_2$ for each mole of $M_2O$ wherein M is selected from the group consisting of sodium, potassium and a mixture thereof, and about 0.5 to about 5 percent by weight water, having a magnesium exchange capacity of more than about 2 milliequivalents of Mg per gram of anhydrous silicate, having the capacity to sorb 30 to 50% by weight of liquid nonionic surfactant, and having a particle size of less than 20 microns.

9. Hydrated amorphous alkali metal silicate particles according to claim 8, wherein the water content is from about 1.1 to about 5 percent by weight.

10. Hydrated amorphous alkali metal silicate particles according to claim 8, wherein the water content is up to about 4.35 percent by weight.

* * * * *